United States Patent [19]

Burton

[11] 4,299,458
[45] Nov. 10, 1981

[54] SELF THREADING PHOTOTYPESETTER TRANSPORT SYSTEM

[75] Inventor: John S. Burton, Los Angeles, Calif.

[73] Assignee: Autologic, Inc., Calif.

[21] Appl. No.: 155,455

[22] Filed: Jun. 2, 1980

[51] Int. Cl.³ .................... G03B 15/00; G03B 17/26; B41B 19/00

[52] U.S. Cl. ......................... 354/6; 354/275; 355/64

[58] Field of Search ............ 355/20, 64, 65; 354/6, 354/275; 242/71.1, 74.1, 74.2, 75.2

[56] References Cited

U.S. PATENT DOCUMENTS

| | | | |
|---|---|---|---|
| 2,838,250 | 6/1958 | Stavrakis et al. | 242/75.2 X |
| 2,879,061 | 3/1959 | Alden | 242/75.2 X |
| 3,345,911 | 10/1967 | Lee | 355/64 X |
| 3,547,536 | 12/1970 | Phleps et al. | 355/64 X |
| 3,557,675 | 1/1971 | Koll et al. | 354/6 |
| 3,608,452 | 9/1971 | Conrad et al. | 355/20 |
| 3,643,559 | 2/1972 | Moyroud | 354/6 |
| 3,645,619 | 2/1972 | Burton et al. | 355/64 X |
| 4,221,479 | 9/1980 | Harvey | 354/275 |

FOREIGN PATENT DOCUMENTS

| | | | |
|---|---|---|---|
| 2601982 | 7/1976 | Fed. Rep. of Germany | 242/71.1 |
| 2638697 | 3/1978 | Fed. Rep. of Germany | 354/275 |

Primary Examiner—Donald A. Griffin
Attorney, Agent, or Firm—William H. Maxwell

[57] ABSTRACT

A media transport system in a phototypesetter for "leading" and "reverse leading" movement of film media at minimal inertia and little friction between a supply cassette and a self-threading take-up cassette, and characterized by vacuum pockets adjustable to varied media width and controlled by sensors for the delivery and removal of media and for the transport thereof across a make-up area where said media is held taught in a focal point while being positioned and moved by encoded drive means synchronizing placement of the typeset image at the make-up area.

48 Claims, 16 Drawing Figures

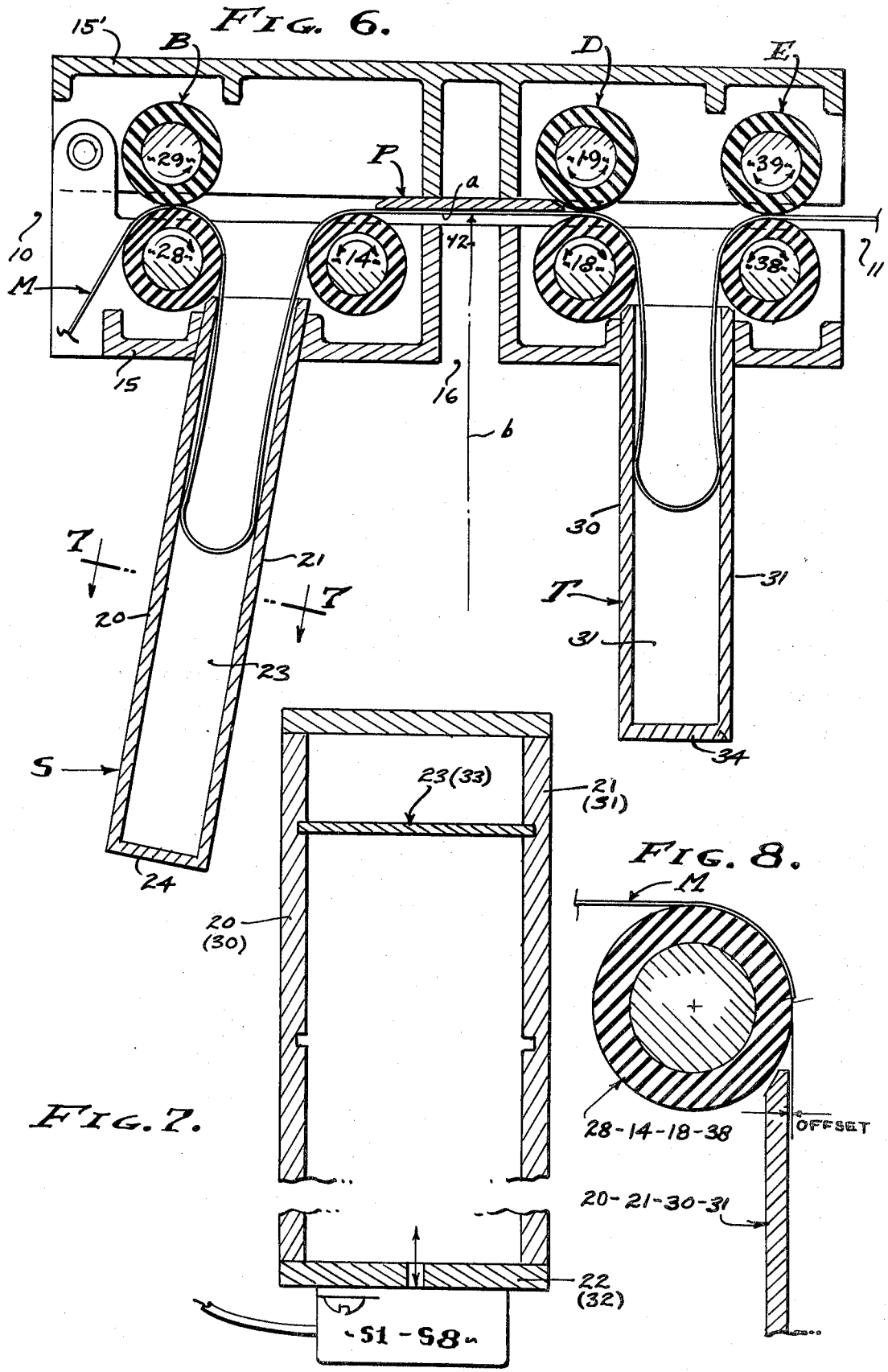

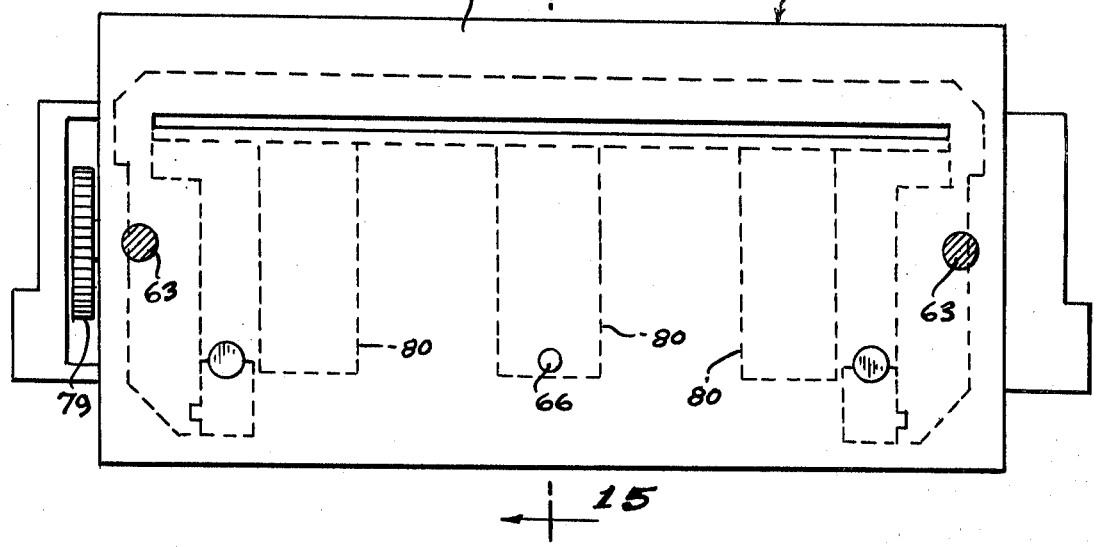
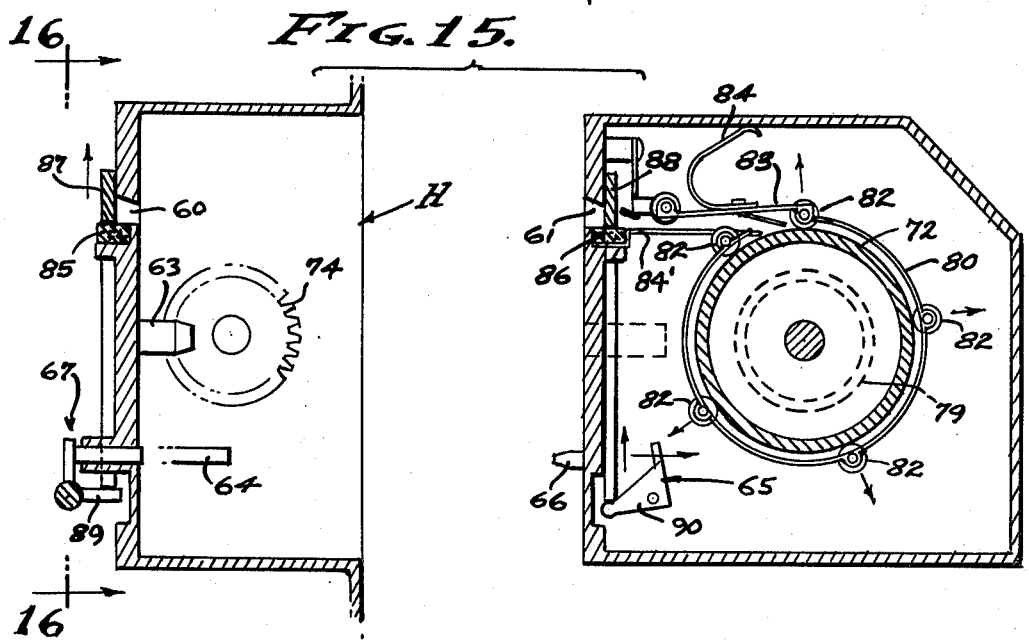
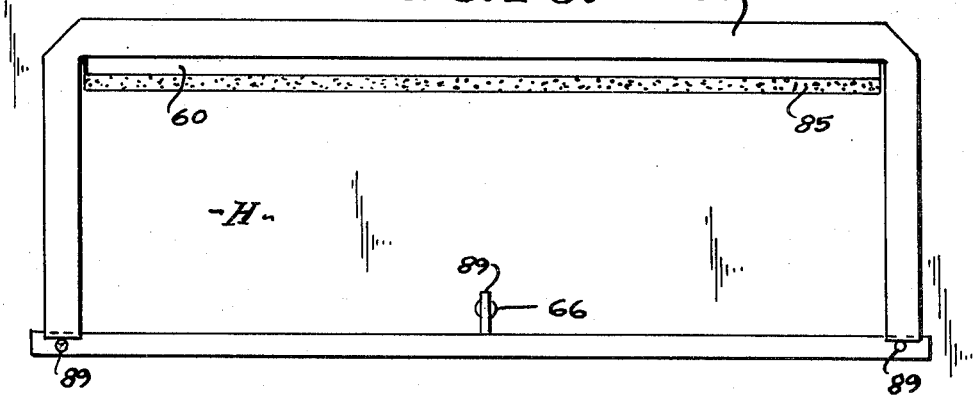

SELF THREADING PHOTOTYPESETTER TRANSPORT SYSTEM

BACKGROUND

The state of the art in setting type provides phototypsetters capable of producing high resolution characters at high speed, for example at speeds up to 4,000 characters per second, and the setting of newsprint at 1250 lines per minute. The media upon which this typesetting is produced is photographic film or paper intermittently fed from a roll supply varying in width from three to seventeen inches. The media has a photo sensitive emulsion that is exposed through a make-up area or aperture to a cathode ray tube and a lens system or the like, whereby photocomposition is attained. A feature of newsprint and the like is that the typesetting is organized into columns or galleys. For example, a newspaper will be comprised of six columns and separated into different news articles between the top and bottom of the page. Accordingly, page composition requires the starting and stopping of the typesetter, for the separation and arrangement of news article in sequence and in side by side relation, including spaces for pictures and the like. Separation is referred to as "leading" when progressing forward or downwardly, and as "reverse leading" when reversing the film media and setting other columns of type adjacent to previously set columns of type. Therefore, it is an object of this invention to provide a storage means for film media ahead of and behind the make-up area or aperture, so as to enable both "leading" and "reverse leading" within the phototypsetter per se.

This invention relates to the handling of exposed media in phototypesetters, wherein film is transported through an aperture from a supply to a take-up. Fragile media such as photographic film is to be transported for exposure without scratching or marring, and moved under low constant tension with minimal inertia, so that it can be accelerated and decelerated quickly. The media is caused to move forward and backward, and friction is to be minimized; and in these respects it is an object herein to advantageously employ a lens system to project images written on a cathode ray tube and onto film media in motion. This is in preference to the use of fiber optic face plate tubes over which the film must be dragged. Accordingly, with the present invention the film media or paper is tensioned between the supply and take-up by unique means that minimizes inertial mass so that there is extraordinarily little friction or drag.

A feature of this phototypsetter transport is its encoder means that is used to measure movement of the media and synchronize the typesetting function by displacing the image written through the optics and onto the moving media in response to said movement thereof. It is an object therefore to provide a transport system with buffer means in the form of a supply pocket and a take-up pocket adapted to maintain a substantially constant tension upon the media as it spans the make-up area or aperture. With the present invention, vacuum pockets are provided to receive loops of media, and as shown to enable reverse leading for example up to 26 inches. In practice, separate systems are used to feed media into the supply pocket and into the take-up pocket, and sensor means at said pockets monitors the media therein; so that when the supply pocket becomes too empty, a feed means brings in more media from the supply; and so that when the take-up pocket becomes too full, a take-up means pulls the media therefrom for delivery into the take-up. A characteristic feature of this transport system is that in moving the media through the make-up area or aperture, the said media is not pulled from heavy rollers or shoved into a crowded take-up area. On the contrary, the involved mass is reduced to that of the media alone, and the tension to be counteracted is produced by the vacuum only as it is regulated at the two pockets.

The state of the art provides media in supply and take-up cassettes, and it is common practice to transport film media with pinch rollers. Accordingly, the present invention employs pinch roller drive means from a supply cassette. However, with the present invention it is an object to tension the media by means of a vacuum pocket, and to this end the media is drawn tight across the make-up area or aperture as said media extends from a supply pocket to the pinch rollers of the drive means. And, additionally there are pinch rollers of a supply means responsive to the aforesaid pocket sensor means to feed the media into said pocket on demand. Similarly, it is an object of this invention to remove exposed media by means of pinch rollers of a take-up means, and to this end the media is drawn from a take-up pocket where it is held taught by a vacuum when delivered thereto by said drive rollers. This is significant in that the media is held in taught equilibrium across the make-up area.

A deficiency in prior art phototypesetters has been the alignment of media as it feeds from the supply cassette. Reference is made to supply cassettes that are supposedly installed in alignment and which journal the spool or core of film media substantially but not exactly aligned, thereby requiring realignment means to receive the film media supplied by the said cassette. With the present invention alignment is inherent, it being an object of this invention to align the cassette core with the transport mechanism and to permit the case of the cassette to float. In this respect the core of the cassette is accurately produced with facility and turns upon centers that are adjustable as to media width, all as circumstances require.

A deficiency in prior art phototypesetters has been the difficulty of threading of and the limited capacity of the take-up cassette. It is therefore an object of this invention to provide self threading and to substantially increase capacity by a direct cooperative relationship with the take-up means as it operates independent of the drive means to fill the cassette. And, intermediate the closely associated take-up means and take-up cassette there it is cutter means that trims and separates sections of media which is self threading into said cassette through a light trap. In practice, the take-up means and take-up cassette have a common drive means.

SUMMARY OF THE INVENTION

This invention has to do with the transport of film media within the restrictive confines of a phototypesetter having a make-up area disposed between a supply and a take-up for said media. The media is light sensitive and must be obscured from light, and to this end is supplied from a supply cassette, is transported through an enclosed housing, and is discharged into a take-up cassette. The composition is electronic and the use of a cathode ray tube is preferred, in which case the speed of composition is great and the resolution of the typesetting high. Heretofore however, speed of supporting equipment has been an impairment, as the mass inertia of various drive and take-up devices, rollers, has slowed the through-put capabilities of said typesetters. It is a general object herein to reduce the mass inertia to a minimum, and with the exception of single pair of pinch rollers, the mass inertia is that of the media only as it extends across the make-up area and into a supply pocket where it is pneumatically tensioned. The said supply pocket is independently fed with media by means of supply pinch rollers on demand controlled by sensors in the supply pocket. There is a take-up pocket where the exposed media is temporarily stored and pneumatically held taught, and from which it can be either "reverse leaded" or discharged into a take-up cassette. There are also controlling sensors in the take-up pocket which is separated from the take-up cassette by a cutter. And, all of which is powered by motor means, and the media movement encoded for synchronization of the typeset image at the make-up area.

The foregoing and other various objects and features of this invention will be apparent and fully understood from the following detailed description of the typical preferred forms and applications thereof, throughout which description reference is made to the accompanying drawings.

DESCRIPTION OF THE DRAWINGS

FIG. 6 is a view similar to FIG. 5 taken as indicated by line 6—6 on FIG. 3.

FIG. 7 is an enlarged detailed view (typical of both vacuum pockets) taken as indicated by line 7—7 on FIG. 6.

FIG. 8 is an enlarged view of the lower roller relationship to the walls of the vacuum pockets.

FIG. 14 is a transverse view of the take-up cassette taken as indicated by line 14—14 on FIG. 2.

FIG. 15 is an exploded view taken as indicated by line 15—15 on FIG. 14; and

FIG. 16 is a view taken as indicated by line 16—16 on FIG. 15.

PREFERRED EMBODIMENT

Figure 1:
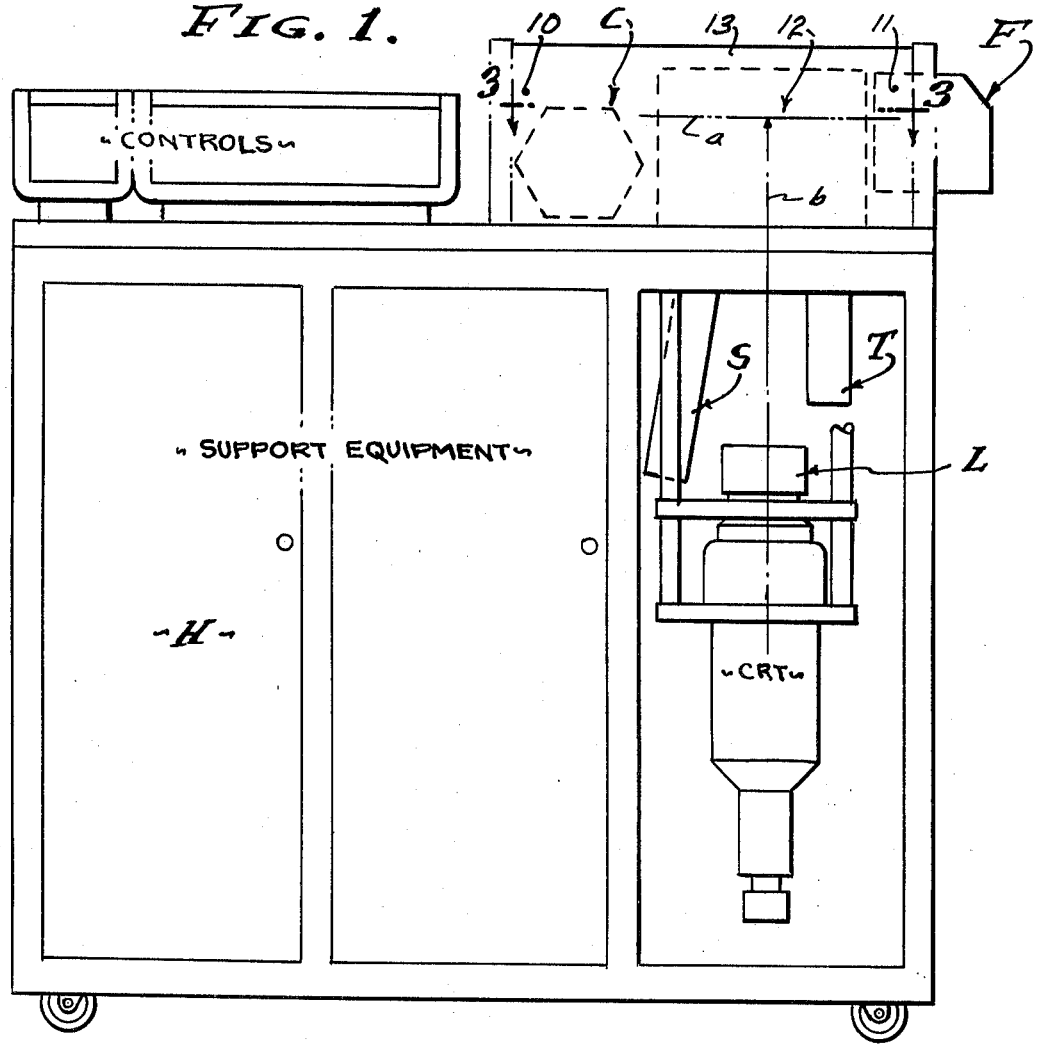
FIG. 1 is a side view of a phototypesetter embodying the self threading transport system of the present invention.
Figure 2:
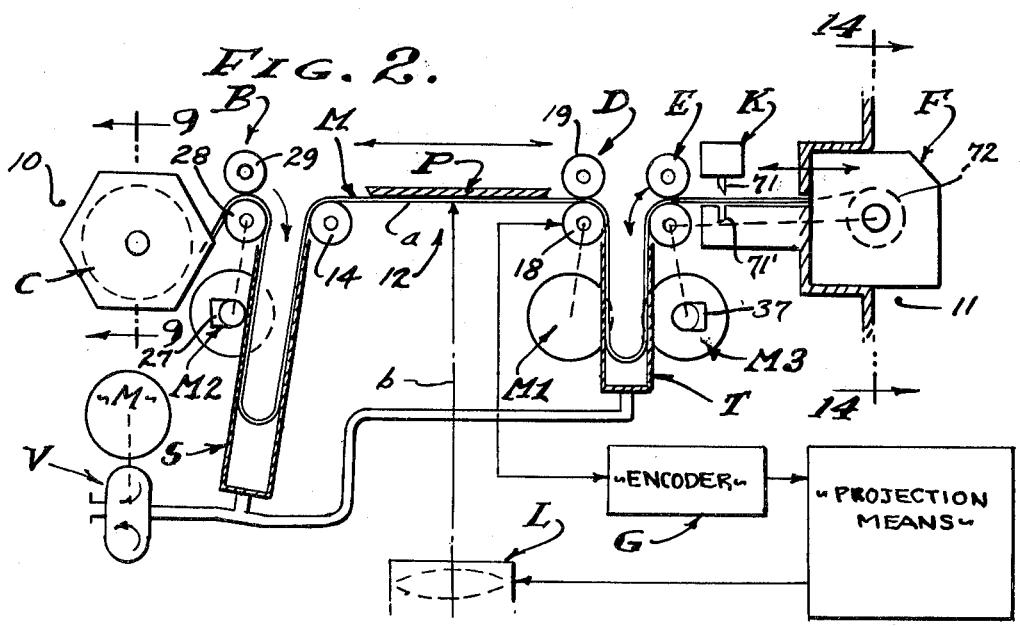
FIG. 2 is a diagramatic view showing the system related to the encoded cathode ray tube projection system.
Figure 3:
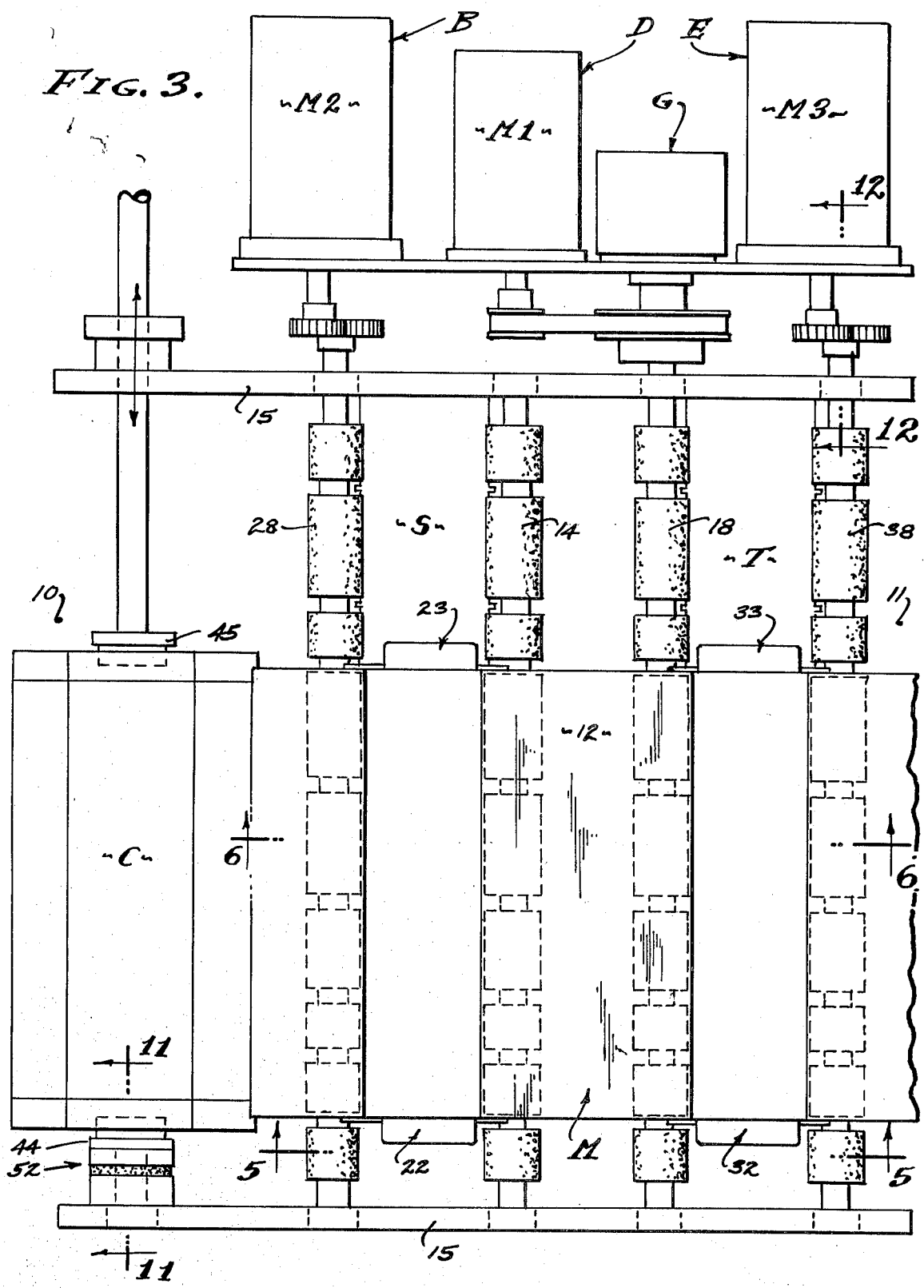
FIG. 3 is an enlarged plan view taken as indicated by line 3—3 on FIG. 1.
Figure 4:
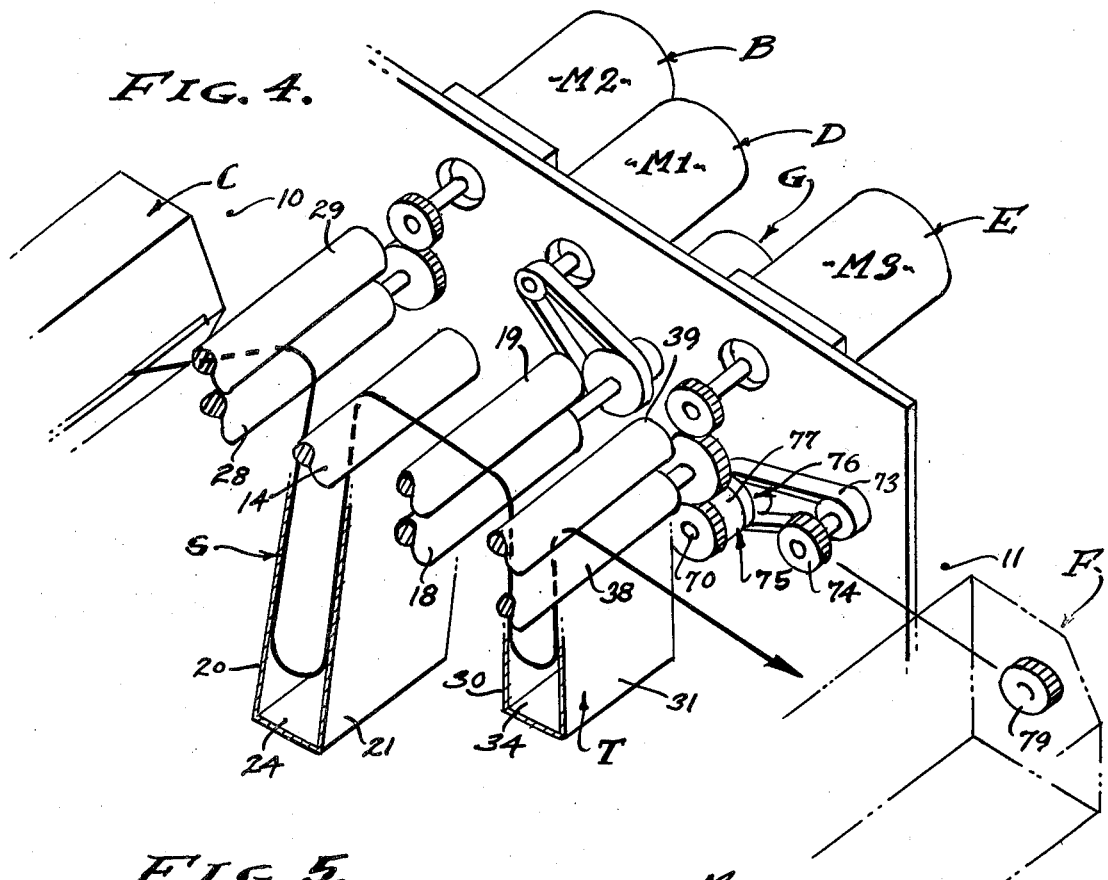
FIG. 4 is a perspective view of the transport system as related to the media.
Figure 5:
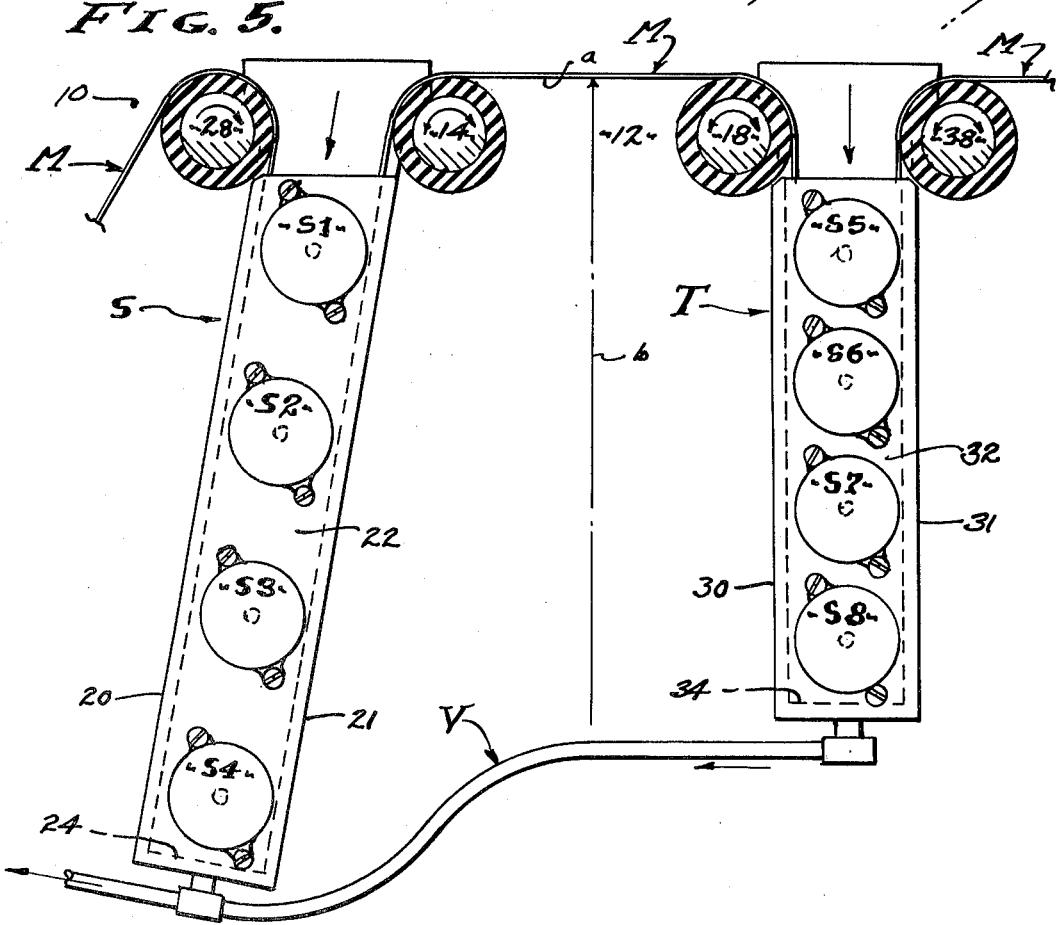
FIG. 5 is an enlarged view of the vacuum pockets and drive roller relationship taken as indicated by line 5—5 on FIG. 3.
Figure 9:
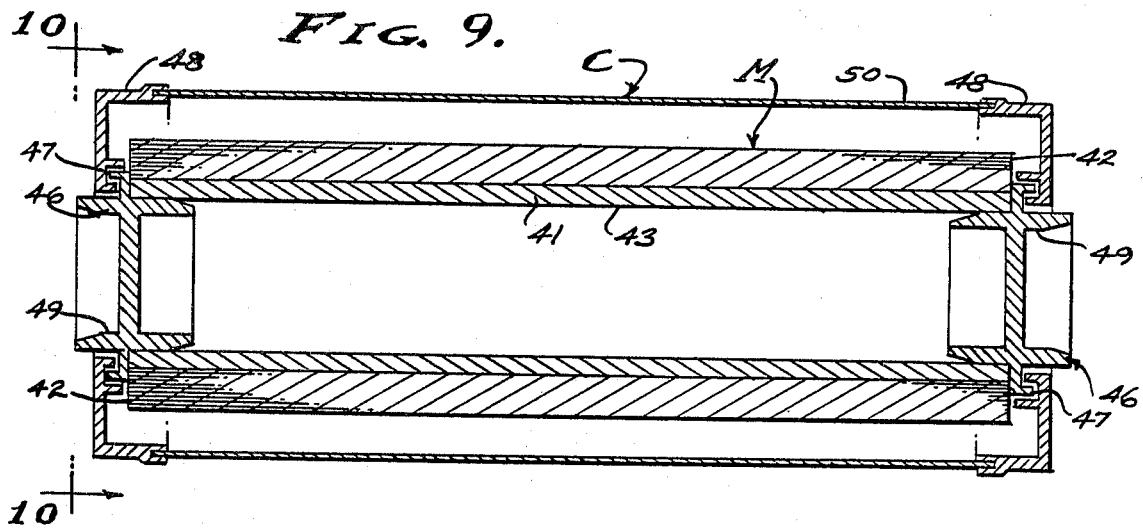
FIG. 9 is a transverse view of the feed cassette taken as indicated by line 9—9 on FIG. 2.
Figure 10:
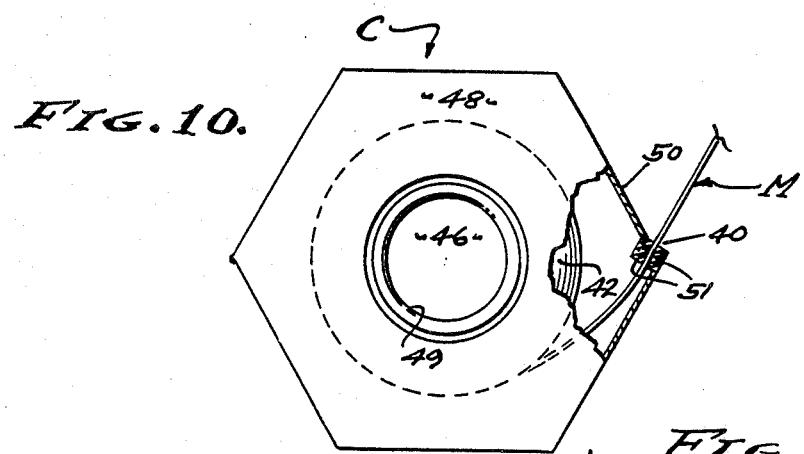
FIG. 10 is an end view taken as indicated by line 10—10 on FIG. 9.
Figure 11:
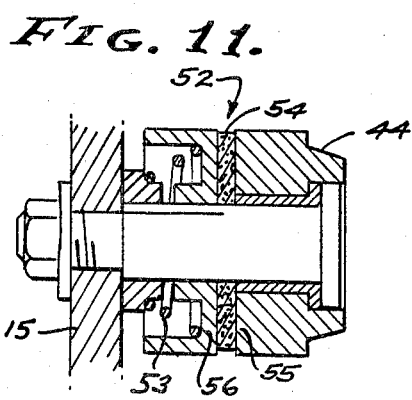
FIG. 11 is an enlarged detailed view of the feed slip clutch taken as indicated by line 11—11 on FIG. 3.
Figure 12:
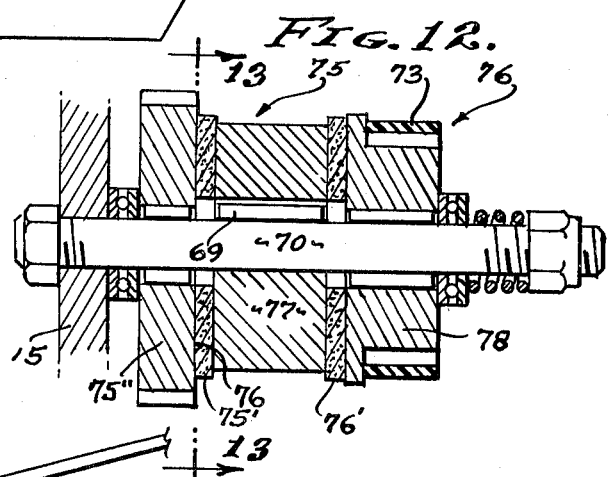
FIG. 12 is an enlarged detailed view of the one-way drive and slip clutch for take-up taken as indicated by line 12—12 on FIG. 3.
Figure 13:
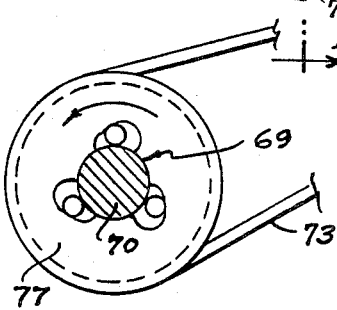
FIG. 13 is a view taken as indicated by line 13—13 on FIG. 12.

Referring now to the drawings, there is a housing H having an input and an output side 10 and 11 between which film media M is transported across a make-up area 12 enclosed by a cover 13. An exposure means comprised of a cathode ray tube CRT and lens L is employed, in which case there is a focal plane a normal to a projection axis b, the former being horizontal and the latter vertical, as shown. The make-up area 12 is embraced by spaced vacuum pockets that characterize this transport system, there being a supply pocket S and a take-up pocket T between which the media is controllably tensioned to extend horizontally beneath a platen P. In accordance with this invention, a media drive means D is at the take-up pocket T where it defines the forward side of the make-up area 12, and a guide roller 14 is at the supply pocket S where it defines the back side of the make-up area. As will be described, a pneumatic vacuum is continuously applied to the two aforesaid pockets whereby the sections of the media being composed are constantly tensioned as they are positioned, repositioned and/or moved intermediate the rollers of the drive means D and the guide roller 14 at the supply pocket S. Media M is delivered to the supply pocket S by a separate media supply means B drawing the same from a supply cassette C, and media M is discharged from the take-up pocket T by a separate media take-up means E delivering the media into a take-up cassette F. The aforesaid drive means D, guide roller 14, supply means B, and take-up means E are closely positioned and the make-up area 12 restricted for compactness and minimized inertial mass in the media M transported thereby, there being cutter means K disposed between the take-up means E and the take-up cassette F.

The housing H is essentially a cabinet for accommodating the required electronics and mechanical gear and the CRT projection system, also to provide a darkened area where the photographic film media is obscured. Precision is a requirement for the composing of characters at the make-up area 12, and to this end there is a lower frame 15 in which the critical rollers are journaled, namely the guide roller 14 and the drive rollers of supply means B, drive means D and take-up means E. Opposing pinch rollers of the means B, D and E are carried by a shiftable upper frame 15' that is lifted for loading the media M between the pinching rollers and exposed to the make-up area 12. As shown, the frames are hinged one to the other. The frame 15 has an aperture 16 which delimits the make-up area 12, the guide roller 14 being transversely disposed at the input side of the aperture 16 where the frame is open to the supply pocket S. It is significant that the circumferentially arcuate training of the media M over the guide roller 14, and over the drive roller 18 later described, is determinative of accurate placement of media in its transport across the aperture 16 of the make-up area 12. The rollers of drive means D are transversely disposed at the output side of the aperture 16 where the frame is open to the take-up pocket T. In practice, the pockets S and T depend from the frame 15 and the upper peripheries of guide roller 14 and lowermost drive roller of means D are coplanar and tangent to the focal plane a, overlying which there is the platen P carried by side rails of the upper frame 15' to ensure flatness of the media M throughout the make-up area 12. The guide roller 14 is a rubber, or the like, faced roller of right cylinder configuration, the peripheral surface thereof being precision ground. In practice, the platen P depresses the media M from the plane of tangency extending between rollers 14 and 18, thereby establishing some frictional engagement in order to arrest motion when required.

The aperture 16 is characteristically a transverse slot open downwardly for exposure of the film media M to a beam from the CRT traversing a vertical plane substantially coincidental with the projection axis b.

The drive means D is a reversible pinch roller means that reversibly transports the film media M across the aperture 16 beneath the platen P. As shown, there is a bottom drive roller 18 journaled in the lower frame 15 and driven by a synchronous type motor M1, and there is a top idle roller 19 journaled in the moveable frame 15, the rollers having engageable peripheries transversely coextensive with the aperture 16 and adapted to "pinch" the media therebetween for its transport forwardly when "leading" and rearwardly when "reverse leading". In accordance with this invention, the pinch rollers 18 and 19 of the drive means D hold the media M taught over the guide roller 14 in both the "leading" and "reverse leading" modes of operation. Encoder means G is provided in the drive roller 18 and motor M1 combination, the motor M1 being a servo drive motor to which the cathode ray tube CRT is synchronized for the placement of characters projected thereby onto the moving media M.

The supply pocket S is an upwardly open vacuum bin comprised of imperforate front and back walls 20 and 21, and side walls 22 and 23, and closed by a bottom wall 24. The front and back walls 20 and 21 are spaced so as to accommodate a depending loop portion of the media M therebetween, with the outside surfaces of the loop engageable therewith respectively. The side walls 22 and 23 are spaced so as to engage the opposite edges of the looped portion of media as it depends into the supply pocket S, thereby closing the lower portion thereof and to establish a chamber in which a partial vacuum is drawn by a motor driven means V. In practice, a vacuum pressure measured as four inches of water is maintained. The walls of the supply pocket are flat and smooth imperforate walls, there being a vertically disposed series of sensor means S1-S4 exposed through side wall 22 at increments of height and responsive to being covered and/or uncovered by the vertical position or extent of the depending loop portion of media M. The effect of these sensors in controlling the media supply is later described.

The take-up pocket T is an upwardly open vacuum bin, essentailly the same as the supply pocket bin above described, and is comprised of imperforate front and back walls 30 and 31, and side walls 32 and 33, and closed by a bottom 34. The front and back walls 30 and 31 are spaced so as to accommodate a depending loop portion of media M therebetween, with the outside surface of the loop portion engageable therewith respectively. The side walls 32 and 33 are spaced so as to engage the opposite edges of the looped portion of media as it depends into the take-up pocket T, thereby closing the lower portion thereof and to establish a chamber in which a partial vacuum is drawn by the motor driven vacuum means V. In practice, the walls of the take-up pocket are flat and smooth imperforate walls, there being a vertically disposed series of sensor means S5-S8 exposed through side wall 32 at increments of height and responsive to being covered and/or uncovered by the vertical position or extent of the depending loop portion of media M. The effect of these sensors in controlling the media discharge is later described.

A feature of this invention is the adaptability to film media of varied width by selective adjustment of the pocket side walls. Accordingly, at least one of the side walls of each vacuum pocket S and T is selectively placeable. In accordance with the invention, the front and back walls 20 and 21 of the supply pocket S are slotted at a plurality of positions as shown in FIG. 7, each of which corresponds to a standarized width of film media M, and into which the side 23 is selectively insertable as circumstances require. Likewise, the front and back walls 30 and 31 of the take-up pocket T are also slotted at the same plurality of positions, whereby the side 33 can be repositioned and corresponding selective adjustments can be made at both pockets S and T. Side clearance is maintained for freedom of the film media M, the side walls being parallel at each of said pockets.

The transport structure thus far described occupies the make-up area 12 disposed between the film media supply comprised of the supply means B and supply cassette C, and the film media take-up comprised of the take-up means E and take-up cassette F. The spacing of front and back walls 20 and 21 and the spacing of front and back walls 30 and 31 are the same and/or identical, and the selective placement of side walls 23 and 33 corresponding, whereby the effective cross sectional area exposed to the vacuum of means V applies an equal force in opposite directions, the media M in the aperture 16 of make-up area 12 being in balanced tension. The motor driven vacuum means V is pressure regulated by means not shown, so that changes in media width can be compensated for and tension force across the aperture 16 controlled. Also, to establish an air flow barrier between the media surface and walls of the pocket S and T to prevent abrasion and/or scratching of the emulsion thereon. It is significant that the tension forces applied by each of the two vacuum pockets S and T are in equilibrium, and consequently the drive means D has only to overcome whatever small amount of sliding friction on the media against the platen P against which it is preferred to be in touching engagement, and whatever small amount of sliding friction there may be with the walls of the vacuum pockets; all of which is minimal, as the engageable surfaces are smooth and polished. It is contemplated that the platen P can be eliminated as the media is under planar tension between the rollers 14 and 18. It will be observed that the loop portion of media in the two vacuum pockets S and T will inversely change in height as the drive means D transports the media forwardly or reversely, as the case may be.

The supply means B is a forwardly feeding pinch roller means that delivers the film media M into the supply pocket S and to a height therein determined by the sensor S2 (and S3). As shown, there is a bottom drive roller 28 journaled in its lower frame 15 and driven by a motor M2, and there is a top idle roller 29 journaled in frame 15', having engageable peripheries transversely coextensive with the width of the supply pocket S and aperture 16 and adapted to "pinch" the media therebetween for feeding forwardly. The pinch rollers 28 and 29 are rubber, or the like, faced rollers of right cylinder configuration, the peripheral surfaces thereof being precision ground. The drive roller 28 is adjacent to the pocket and with its side periphery in a tangent plane juxtaposed to the front wall 20 (Slightly inward) and its upper periphery in a horizontal plane coincidental with the upper periphery of the guide roller 14 which is adjacent to the pocket and with its side periphery in a tangent plane juxtaposed to back wall 21

(slightly inward) of the vacuum pocket S. Accordingly, the film media M is adapted to lie over the open upper end of the supply pocket S and is subject to being drawn into a loop therein when vacuum pressure is applied. The sensor means S1–S4 are provided, preferably pressure sensors responsive to air pressure above and below the loop of media as it extends into the supply pockets. In one form the sensors S2 and S3 are positioned at the intermediate high and low limits of the loop and actuate switch means to alternately energize motor M2 and thereby supply film media M on demand when the loop portion of media is shortened to traverse above sensor S2, and conversely to stop the delivery of film media M when the loop portion of media is lengthened to travserse below sensor S3. Alternately, a second and preferred form eliminates the sensor S3, in which case sensor S2 determines the low limit of the film media loop, the motor M2 being normally energized to supply the media until a normal demand therefor is met by the loop portion of media traversing below the sensor S2. A feature of motor M2 is its friction brake drive 27 that prevents turning of drive roller 28 under pull of the media loop drawn into the supply pocket S by vacuum therein. Accordingly, when the motor M2 is deenergized it is not free to turn, and the supply loop of media is restrained. The higher and lower sensors S1 and S4 are fault or safety switches to detect extremes and thereby signal the abnormalty to a controller.

The supply cassette C is a forwardly feeding film media supply placed at the input side 10 of the housing H, preferably within the obscured chamber therein, and has a delivery slot 40 from which the film media M issues. The cassette C is light-tight and protects the medida M for daylight loading. In practice, several hundred feet of film media is wound emulsion side out upon a paperboard core 41 of right cylinder tube form cut to a media width ranging from 75 mm, 100 mm, 150 mm etc. in increments as may be required up to a miximum width of the typesetter aperture 16. Accurate width an parallelism of the film media M is determined by precision cutting of the wound core into said right cylinder form with exactly normal ends 42 and a concentric inner diameter 43 of said paperboard core 41. Accordingly, the frame 15 includes transversely spaced coaxial journal members from which opposed rotating centers project to engageably carry the wound core of media M, a fixed center 44 at one side of the frame, and an adjustably extensible center 45 at the other side. A centering plug 46 having a light trap flange 47 is force fit into the core 41, into the diameter 41 at opposite ends, there being end caps 48 engaged over the ends of the core with an opening for center access to the concentric bore 49 of the plug and with a concentric labyrinth cooperatively embracing the plug flange 47. The cassette wall 50 extends between the caps 48, with the slot 40 disposed coextensively between the cap end walls and carrying opposed lips 51 of soft plush material depressibly engageable with the film media that is frictionally drawn therethrough. The cross sectional configuration of the cassette wall 50 and end caps 48 is hexagonal, and the exit plane of the lips 51 adjacently parallel to a face thereof, to be disposed upwardly tangent with respect to the drive roller 38 as shown. A light friction restraint is provided in the form of a drag clutch 52 at the fixed center 44, a slip clutch shown as a spring 53 biased felt 54 operating between opposed discs 55 and 56, and one of which is fixed and the other live with the center 44. In practice, a media-used sensor means (not shown) is provided in the form of a counter driven by the media drive roller 28 engageable with the media as it issues from the cassette C. It is significant that the media M issues upwardly and is trained arcuately around guide roller 14, to be accurately directed thereby. In its preferred form, the supply cassette C is expendible once depleted of the media M supplied therefrom.

The take-up means E is a reversible pinch roller means that permits forward leading movement of the film media M from the take-up pocket T in response to a low limit therein as determined by sensor S7, and permits reverse leading movement of the film media M into the take-up pocket T in response to a high limit therein as determined by the sensor S6. As shown, there is a bottom drive roller 38 journaled in the lower frame 15 and driven by a motor M3, and there is a top idle roller 39 journaled in frame 15', the rollers having engageable peripheries transversely coextensive with the width of the take-up pocket T and aperture 16 and adapted to "pinch" the media therebetween for feeding it forwardly and reversely. A feature is the take-up pocket T and take-up cassette F combination which provides the "reverse leading" capability wherein film media is withdrawn from the cassette F in response to the withdrawal of the loop of media from said take-up pocket T. Accordingly, there is a forwardly feeding slip clutch drive 75 from motor M3 through a reverse slip clutch drive 76 to the spool 72 of the take-up cassette F. The forward drive 75 is shown as a spring biased felt 75' operating between a drive disc 75" and a driven disc 77 journaled an a contershaft 70 to rotate forwardly only as it is governed by a one-way Sprag-type clutch 69 or the like anchored to the frame 15. The reverse drive 76 is shown as a spring biased felt 76' operating between the driven disc 77 and a drive pulley 78 with a belt 73 to an intermediate gear 74 which revolves with the cassette spool 72. When the driven disc 77 is reversely anchored by clutch 69, the slip clutch 76 permits withdrawal of media M from cassette F for "reverse leading".

Referring now to the take-up means E, the pinch rollers 38 and 39 are rubber, or the like, faced rollers of right cylinder configuration, the peripheral surfaces thereof being precision ground. The drive roller 38 is adjacent to the pocket and with its side periphery in a tangent plane justaposed to the back wall 31 (slightly inward) and with its upper periphery in a horizontal plane coincidental with the upper periphery of the drive roller 18 which is adjacent to the pocket and with its side periphery is a tangent plane juxtaposed to the front wall 30 (slightly inward) of the vacuum pocket T. Accordingly, the film media M is adapted to lie over the open upper end of the take-up pocket T, and is subject to being drawn into a loop therein when a vacuum pressure is applied. Accordingly, the sensor means S5–S8 are provided, preferably pressure sensors responsive to air pressure above and below the loop of media as it extends into the take-up pocket T. The sensors S6 and S7 are positioned at the intermediate high and low limits of the loop and actuate switch means to alternately energize the motor M3 to operate reversely and forwardly, respectively, the switch means also being responsive to simultaneous reverse movement of drive means D to implement a corresponding reverse movement of the motor M3. Accordingly, when the media loop travserses below sensor S7 the motor M3 is energized in the forward mode so as to discharge media M into the take-up cassette F. However, when the media loop traverses above sensor S6 the motor M3 is energized in the reverse mode providing that the motor M1 of the drive means D is simultaneously in the reverse leading mode. A feature of motor M3 is its friction brake drive 37 that prevents turning of drive roller 38 under pull of the media loop drawn into the take-up pocket T by the vacuum therein. Accordingly, when motor M3 is deenergized it is not free to turn and the take-up loop of media is restrained. In practice, the higher and lower sensors S5 and S8 are fault or safety switches to detect extremes and thereby signal the abnormalty to a controller, the sensor S6 being located at an intermediate height whereby a substantial reserve of film media M is ever present for "reverse leading".

The cutter means K is disposed closely between the take-up means E and the discharge slot 54 through which the film media M is delivered into the take-up cassette F. The cutter means K is electro-mechanical and located adjacently inside the output side 11 of the housing H, and is a shear comprised of relatively moveable blades 71 and 71'. In practice, the blades are normal to the media and are more than coextensive with the width thereof, the lower blade 71 being stationary and the upper blade 71' reciprocated vertically so as to cross the respective cutting edges thereof, as by means of an electro magnet responsive to a controller.

The take-up cassette F is a light-tight self threading forwardly feeding receiver placed at the output side 11 of the housing H, adaptable to a recess in the exterior thereof, and has a reception slot 61 into which film media M is discharged from a delivery slot 60 in the housing H. The case 62 of the cassette F is complementary to the recess in the side 11 of the housing H, with the slots 61 and 60 in coplanar alignment with the discharge plane of pinch rollers 38 and 39 of the take-up means E. Spaced guide pins 63 project from the housing H within said recess to ensure alignment of the cassette case 62. Spaced operating pins 64 also project from the housing H within said recess to engageably operate closure means 65 for slot 61 in order to open the same when the cassette F is in working position. Similarly, an operating pin 66 projects from the cassette case 62 to engageably operate closure means 67 for slot 60 in the housing H in order to open the same when the cassette F is in working position. Insertion of the cassette F into the said recess obscures light prior to simultaneous operation of the closures 65 and 67, a disclosure of one means sufficing for both, as follows: The slot 60(61) comprises an elongated felt 85 (86) opposed by a shiftable shutter bar 87 (88) separated therefrom by means of a bell-crank 89 (90) operated by the pushing pin 66 (64). It is positioning of the take-up cassette F within the housing recess that opens the slots, and removal which closes them. The light tight cassette case 62 is a reusable fixture and is openable and comprised of end members with bearings upon which a take-up spool 72 is journaled upon an axis with that of pinch rollers 38 and 39. A feature is the reversible one-way slip drive of the take-up cassette F through the above described slip clutch drive 75-76 that is gear driven from the drive roller 38 of the take-up means E. As shown, the belt drive 73 to the cassette drive gear 74 increases the speed of rotation in the spool 72 through driven gear 79, ensuring that the media M is always taught. Gears 74 and 79 are separable (see FIG. 15).

Self threading means of cassette F includes one or more and preferably three spaced spring bands 80 constrictedly embracing the take-up spool 72, trained to extend therearound in the direction of rotation. The spring bands 80 are split in alignment with the reception slot 61 and so that they are expansible as media M is wound onto the spool 72. A guide 81 directs the leading edge of media M to the inner curvature of the spring bands 80, emulsion side in, to be turned involutely onto the take-up spool 72. Circumferentially spaced anti-friction rollers 82 engage the expanding circumference of the winding media M, the spring bands 80 being articulated to accomodate the expanding diameter by means of a link 83 biased into constricted engagement over the take-up spool 72 by a spring 84. The emulsion side of the film media is directed by a guide 84' and winds into place on the spool 72 inside the spaced rollers 82 engaged with the back side of the media to press its emulsion side in and onto the spool without abrasion.

From the foregoing it will be seen that a novel combination utilizing the tensioning effect of spaced vacuum columns is advantageously employed in a phototypesetter wherein film media is pulled tight through a focal plane to be exposed while in motion. Inertia of the media per se is primarily all that is involved, as the media is maintained in tensioned equilibrium; only the additional inertia and friction of pinch drive rollers and motor means therefor is involved.

The media M issues from a daylight loading disposable cassette C wherein friction prevents overrun of the supply core, and the media is fed therefrom only. A pair of pinch rollers of supply means B pulls the media out of the supply cassette C and feeds it into a supply loop formed by the supply pocket S. A light tension is continuously maintained by vacuum means V, the supply pocket S having a loop depth to provide storage for a twenty six inch "reverse lead". A pair of high and low control vacuum switch sensors S2 and S3 sets the normal level of media in the supply pocket. As the media M is trained and winds around guide roller 14 it is accurately directed so as to traverse the focal plane emulsion side down, engaged with and beneath the platen P. The platen P ensures that the media remains flat for critical focus. Encoding is associated with the drive roller 18 of drive means D and directly measures media movement forwardly and reversely, in order to coordinate and center the beam of the cathode ray tube with said movement. The exposed media (also unexposed media) enters the take-up pocket T which provides a delivery storage buffer with controlling vacuum switch sensors S5 and S8 for governing the motor drive of take-up means E, which like supply pocket S has a loop depth to provide limited storage for "reverse leading". Film media in excess of the loop limited by sensor S7 is automatically discharged through slot 60 and into the self threading take-up cassette F.

Operation of this phototyesetter is enabled by loading the supply cassette C into place, by lifting the upper frame 15' and pulling the media manually over the pockets S and T and beyond the drive roller 38 of the take-up means E, whereupon the upper frame 15' carrying the platen P and the idle rollers of the pinch roller pairs is dropped into operating position. At this point the cutter means K can be used to trim the leading edge of the media. When the cover 13 is closed, an interlock means is actuated and starts the self threading cycle. Firstly, the vacuum means V is activated. Secondly, the motor drive of supply means B is activated. Media is then fed out of supply cassette C until sensor S2 or S3 deenergizes said motor drive, indicating that a normal loop is established in the supply pocket S. Thirdly, motor drive of take-up means E is activated and the media moved in a forward direction until sensor S7 deenergizes said motor drive. Note that at this point the media has not entered the take-up cassette F, however upon an excessive loop of media in take-up pocket T the media M will then commence to be discharged through slot 60 and self threaded into take-up cassette F hereinabove described. The cassette spool 72 has a potential peripheral media speed 34% to 50% faster than the take-up means E and is driven by the same through the slip clutch as described. The cutter means K is in close proximity to both the drive means E and to the slot 60, and the closure means 65 and 67 are of the flat plate shutter type with no drag upon the film media M.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A transport system for "leading" and "reverse leading" light sensitive roll film media through a make-up area of a phototypesetter, and including;

a forwardly feeding media supply means at the input side of a light obscuring housing, an upwardly open supply pocket receiving media at the input side of the housing and comprised of transverse front and back walls coextensively engageable with the width of the media and opposite side walls engageable with the opposite edges thereof and a bottom wall closing the same establishing a vacuum chamber beneath a supply loop of media formed therein, an upwardly open take-up pocket spaced forwardly from the supply pocket with the make-up area extending therebetween and comprised of transverse front and back walls coextensively engageable with the width of media and opposite side walls engageable with the opposite edges thereof and a bottom wall closing the same establishing a vacuum chamber beneath a take-up loop of media formed therein, exposure means transversely coextensive or of the make-up area, a vacuum means drawing air from the supply and take-up pockets to draw respective supply and take-up loops of media therein and tensioning the media in a focal plane as it extends through the make-up area, reversible drive means at the input side of the take-up pocket and transporting the media through the make-up area between the supply pocket and take-up pocket, and a take-up means at the output side of the take-up pocket and transmitting media to and from the take-up pocket.

2. The phototypesetter transport system as set forth in claim 1, wherein a single guide roller transfers media to and from the supply pocket and the drive means includes a drive roller that transfers media to and from the take-up pocket, the upper peripheries of said guide roller and drive roller being coincidental at a plane of exposure.

3. The phototypesetter transport system as set forth in any one of claims 1 or 2, wherein a platen is downwardly engageable with the media extending through the make-up area.

4. The phototypesetter transport system as set forth in claim 1, wherein a single guide roller with its side periphery substantially tangent to the front wall of the supply pocket transfers media to and from the supply pocket, and the drive means includes a drive roller with its side periphery substantially tangent to the back wall of the take-up pocket and transfers media to and from the take-up pocket, the upper peripheries of said guide roller and drive roller being coincidental at a plane of exposure.

5. The phototypesetter transport system as set forth in any one of claims 2 or 4, wherein the supply pocket and guide roller and take-up pocket and drive means drive roller are carried in alignment by a common frame.

6. The phototypesetter transport system as set forth in any one of claims 2 or 4, wherein an idle roller parallel to and disposed over the said drive means drive roller engages the media on said drive roller for "pinch roller" engagement, wherein the supply pocket and guide roller and take-up pocket and drive means drive roller are carried in alignment by a common frame, and wherein the idle roller is carried in said parallel alignment by a frame overlying and shiftable to open from the first mentioned frame to expose the media for loading.

7. The phototypesetter transport system as set forth in any one of claims 2 or 4, wherein an idle roller parallel to and disposed over the said drive means drive roller engages the media on said drive roller for "pinch roller" engagement, wherein the supply pocket and guide roller and take-up pocket and drive means drive roller are carried in alignment by a common frame, and wherein the idle roller and a platen downwardly engageable with the media are carried in alignment by a frame overlying and shiftable to open from the first mentioned frame to expose the media for loading.

8. The phototypesetter transport system as set forth in claim 1, wherein sensor means responsive to height of the media loop in the supply pocket activates the forwardly feeding supply means to establish said supply media loop height.

9. The phototypesetter transport system as set forth in claim 1, wherein sensor means responsive to height of the media loop in the take-up pocket activates the take-up means to establish said take-up media loop height.

10. The phototypesetter transport system as set forth in claim 1, wherein sensor means responsive to height of the media loop in the supply pocket activates the forwardly feeding supply means to establish said supply media loop height, and wherein sensor means responsive to height of the media loop in the take-up pocket activates the take-up means to establish said take-up media loop height.

11. The phototypesetter transport system as set forth in claim 1, wherein the reversible drive means and exposure means are synchronized by encoder means for placement of characters imposed upon the moving media.

12. The phototypesetter transport system as set forth in claim 1, wherein the exposure means comprises a cathode ray tube and lens system disposed on a projection axis normal to a focal plane of exposure extending transversely coextensive of said make-up area.

13. The phototypesetter transport system as set forth in claim 1, wherein the exposure means comprises a cathode ray tube and lens system disposed on a projection axis normal to a focal plane of exposure extending transversely coextensive of said make-up area, and wherein the reversible drive means and cathode ray tube exposure means are synchronized by encoder means for placement of characters projected upon the moving media.

14. The phototypesetter transport system as set forth in claim 1, wherein the forwardly feeding media supply means includes a drive roller that delivers media into the supply pocket.

15. The phototypesetter transport system as set forth in claim 1, wherein the forwardly feeding media supply means includes a drive roller with its side periphery substantially tangent to the back wall of the supply pocket and delivers media into said pocket.

16. The phototypesetter transport system as set forth in any one of claims 14 or 15, wherein an idle roller parallel to and disposed over the said media supply means drive roller engages media on said drive roller for "pinch roller" engagement.

17. The phototypesetter transport system as set forth in claim 1, wherein the forwardly feeding media supply means includes a drive roller with its side periphery substantially tangent to the back wall of the supply pocket and delivers media into said pocket, wherein a guide roller with its side periphery substantially tangent to the front wall of the supply pocket transfers media to and from the supply pocket, and wherein the drive means includes a drive roller with its side periphery substantially tangent to the back wall of the take-up pocket that transfers media to and from the take-up pocket, the upper peripheries of said guide roller and drive rollers being coincidental at a plane of exposure.

18. The phototypesetter transport system as set forth in claim 17, wherein an idle roller is disposed parallel to and over each of said media supply means drive roller and drive means drive roller, and engage said drive rollers for "pinch roller" engagement.

19. The phototypesetter transport system as set forth in claim 18, wherein the supply pocket and guide roller and take-up pocket and drive rollers are all carried in alignment by a common frame, and wherein the idle rollers are all carried in alignment by a frame overlying and shiftable to open from the first mentioned frame to expose the media for loading.

20. The phototypesetter transport system as set forth in claim 17, wherein the supply pocket and guide roller and take-up pocket and drive rollers are all carried in alignment by a common frame.

21. The phototypesetter transport system as set forth in claim 1, wherein the take-up means includes a drive roller that receives media from the take-up pocket.

22. The phototypesetter transport system as set forth in claim 1, wherein the take-up means includes a drive roller with its side periphery substantially tangent to the front wall of the take-up pocket and receives media from said pocket.

23. The phototypesetter transport system as set forth in any one of claims 21 or 22, wherein an idle roller parallel to and disposed over the said take-up means drive roller engages said drive roller for "pinch roller" engagement.

24. The phototypesetter transport system as set forth in claim 1, wherein the forwardly feeding media supply means includes a drive roller that delivers media into the supply pocket, and wherein the take-up means includes a drive roller that receives media from the take-up pocket.

25. The phototypesetter transport system as set forth in claim 1, wherein the forwardly feeding media supply means includes a drive roller with its side periphery substantially tangent to the back wall of the supply pocket and delivers media into said pocket, and wherein the take-up means includes a drive roller with its side periphery substantially tangent to the front wall of the take-up pocket and receives media from said pocket.

26. The phototypesetter transport system as set forth in claim 1, wherein the forwardly feeding media supply means includes a drive roller with its side periphery substantially tangent to the back wall of the supply pocket and delivers media into said pocket, wherein the take-up means includes a drive roller with its side periphery substantially tangent to the front wall of the take-up pocket and receives media from said pocket, wherein a guide roller with its side periphery substantially tangent to the front wall of the supply pocket transfers media to and from the supply pocket, and wherein the reversible drive means includes a drive roller with its side periphery substantially tangent to the back wall of the take-up pocket that transfers media to and from the take-up pocket, the upper peripheries of said guide roller and drive rollers being coincidental at a plane of exposure.

27. The phototypesetter transport system as set forth in claim 26, wherein an idle roller is disposed parallel to and over each of said media supply means drive roller, reversible drive means drive roller, and take-up means drive roller, and engage said drive rollers for "pinch roller" engagement.

28. The phototypesetter transport system as set forth in claim 1, wherein the take-up means is reversible and includes a drive roller that moves media to and from the take-up pocket.

29. The phototypesetter transport system as set forth in claim 1, wherein the take-up means is reversible and includes a drive roller with its side periphery substantially tangent to the front wall of the take-up pocket and moves media to and from said pocket.

30. The phototypesetter transport system as set forth in claim 1, wherein the forwardly feeding media supply means includes a drive roller that delivers media into the supply pocket, and wherein the take-up means is reversible and includes a drive roller that moves media to and from the take-up pocket.

31. The phototypesetter transport system as set forth in claim 1, wherein the forwardly feeding media supply means includes a drive roller with its side periphery substantially tangent to the back wall of the supply pocket and delivers media into said pocket, and wherein the take-up means is reversible and includes a drive roller with its side periphery substantially tangent to the front wall of the take-up pocket and moves media to and from said pocket.

32. The phototypesetter transport system as set forth in claim 1, wherein the forwardly feeding media supply means includes a drive roller with its side periphery substantially tangent to the back wall of the supply pocket and delivers media into said pocket, wherein the take-up means is reversible and includes a drive roller with its side periphery substantially tangent to the front wall of the take-up pocket and moves media to and from said pocket, wherein a guide roller with its side periphery substantially tangent to the front wall of the supply pocket transfers media to and from the supply pocket, and wherein the reversible drive means includes a drive roller with its side periphery substantially tangent to the back wall of the take-up pocket that transfers media to and from the take-up pocket, the upper peripheries of said guide roller and drive rollers being coincidental at a plane of exposure.

33. The phototypesetter transport system as set forth in claim 32, wherein an idle roller is disposed parallel to and over each of said media supply means drive roller, reversible drive means drive roller, and take-up means drive roller, and engage said drive rollers for "pinch roller" engagement.

34. The phototypesetter transport system as set forth in claim 1, wherein a forwardly feeding supply cassette comprises a core rolled with the film media centered thereon and rotatable on turning centers supported by the housing and disposed on a transverse axis parallel to a drive roller of said media supply means.

35. The phototypesetter transport system as set forth in claim 1, wherein a forwardly feeding supply cassette comprises a core rolled with the film media centered thereon and rotatable on axially adjustable turning centers supported by the housing and disposed transversely parallel to a drive roller of said media supply means.

36. The phototypesetter transport system as set forth in claim 1, wherein a forwardly feeding supply cassette comprises a core rolled with the film media centered thereon and rotatable on turning centers supported by the housing and with friction drag means and disposed on a transverse axis parallel to a drive roller of said media supply means.

37. The phototypesetter transport system as set forth in claim 1, wherein a forwardly feeding supply cassette comprises a core rolled with the film media centered thereon and rotatable on axially turning centers supported by the housing and with friction drag means and disposed transversely parallel to a drive roller of said media supply means.

38. The phototypesetter transport system as set forth in claim 1, wherein a forwardly feeding supply cassette comprises a light tight case and a core rolled with the film media centered thereon and rotatable on axially adjustable turning centers supported by the housing and disposed transversely parallel to a drive roller of said supply means, said case being rotatable on the core to float on the axis of rotation and with a slot issuing the media to the drive roller.

39. The phototypesetter transport system as set forth in claim 1, wherein the pocket side walls are adjustably positioned to engage the mdia width, and wherein a forwardly feeding supply cassette comprises a core rolled with the film media centered thereon and rotatable on axially adjustable turning centers supported by the housing and disposed transversely parallel to a drive roller of said media supply means.

40. The phototypesetter transport system as set forth in claim 1, wherein the pocket side walls are adjustably positioned to engage the media width, and wherein a forwardly feeding supply cassette comprises a light tight case and a core rolled with the film media centered thereon and rotatable on axially adjustable turning centers supported by the housing and disposed transversely parallel to a drive roller of said supply means, said case being rotatable on the core to float on the axis of rotation and with a slot issuing the media to the drive roller.

41. The phototypesetter transport system as set forth in claim 1, wherein a self threading take-up cassette receives the discharge of the film media from a drive roller of said media take-up means and includes, a light tight case, a spool rotatable in the case to receive the discharge of film media from the drive roller of said media take-up means, and at least one single length of spring band constrictedly embracing and split tangent to the spool and extending substantially around the full circumference of said spool in the direction of rotation to receive and engage the media thereon.

42. The phototypesetter transport system as set forth in claim 41, wherein the take-up cassette spool is driven from the drive roller of the take-up means in a forwardly feeding direction by non reversible friction clutch means whereby film media is withdrawn during "reverse leading" from the take-up cassette by the loop thereof drawn into the take-up pocket.

43. The phototypesetter transport system as set forth in claim 1, wherein a self threading take-up cassette receives the discharge of the film media from a drive roller of said media take-up means and includes, a light tight case, a spool rotatable in the case to receive the discharge of film media from the drive roller of said media take-up means, and at least one single length of spring band constrictedly embracing and split tangent to the spool and extending substantially around the full circumference of said spool in the direction of rotation to receive and engage the media thereon, and circumferentially spaced anti-friction rollers carried by the at least one spring band to engage the outer periphery of the film media.

44. The phototypesetter transport system as set forth in claim 1, wherein a take-up cassette receives the discharge of the film media from a drive roller of said media take-up means and includes a light tight case, a spool rotatable in the case to receive the discharge of film media from the drive roller of said take-up means and through a slot in the housing, closure means for the housing slot, there being guide pins projecting from the housing to locate the cassette on the housing in alignment with the housing slot and means simultaneously engaged with the closure means for the housing slot to open the same.

45. The phototypesetter transport system as set forth in claim 1, wherein a forwardly feeding take-up cassette receives the discharge of the film media from a drive roller of said media take-up means and includes a light tight case, a spool rotatable in the case to receive the discharge of film media from the drive roller of said take-up means and through a slot in the cassette case, closure means for the cassette case, there being guide pins projecting from the housing to locate the cassette on the housing and means simultaneously engaged with the closure means for the cassette slot to open the same.

46. The phototypesetter transport system as set forth in claim 1, wherein a take-up cassette receives the discharge of the film media from the drive roller of said media take-up means and includes a light tight case, a spool rotatable in the case to receive the discharge of film media from the drive roller of said take-up means sequentially through a slot in the housing and a through slot in the cassette case, separate closure means for the housing slot and cassette case slot, there being guide pins projecting from the housing to locate the cassette in the housing with the slots in alignment and means simultaneously engaged with the respective closure means to open the same.

47. The phototypesetter transport system as set forth in claim 1, wherein a take-up cassette receives the discharge of the film media from said media take-up means, and wherein the take-up cassette is driven from the take-up means in a forwardly feeding direction by non reversible friction clutch means whereby film media is withdrawn during "reverse leading" from the take-up cassette by the loop thereof drawn into the take-up pocket.

48. The phototypesetter transport system as set forth in claim 1, wherein a take-up cassette receives the discharge of the film media from said media take-up means, and, wherein the take-up cassette is driven from the take-up means in a forwardly feeding direction by non reversible friction clutch means whereby film media is wighdrawn during "reverse leading" from the take-up cassette by the loop thereof drawn into the take-up pocket, and wherein transverse cutter means is disposed between the take-up means and the take-up cassette whereby cut film media is discharged into said cassette.

* * * * *